(12) United States Patent
Riccardi

(10) Patent No.: US 6,622,423 B1
(45) Date of Patent: Sep. 23, 2003

(54) RECYCLABLE TRAY LINERS FOR WOODEN MUSHROOM-GROWING TRAYS

(76) Inventor: Victor Riccardi, 251 Knickerbocker Ave., Stamford, CT (US) 06907

(*) Notice: Subject to any disclaimer, the term of this patent is extended or adjusted under 35 U.S.C. 154(b) by 0 days.

(21) Appl. No.: 10/119,062

(22) Filed: Apr. 9, 2002

(51) Int. Cl.$^7$ .................................................. A01G 1/04
(52) U.S. Cl. ................................. 47/1.1; 47/18; 47/39
(58) Field of Search ........................... 47/18, 39, 66, 47/86, 66.5, 66.1, 87, 1.1; 206/509; 217/3 R; A01G 1/04

(56) References Cited

U.S. PATENT DOCUMENTS

| | | | |
|---|---|---|---|
| 1,983,806 A | * | 12/1934 | Norman |
| 3,751,852 A | * | 8/1973 | Schrepper .................. 47/34.13 |
| 3,842,534 A | * | 10/1974 | Wlaters et al. ................. 47/1.1 |
| 4,001,966 A | * | 1/1977 | Metzner ........................ 47/1.1 |
| 4,349,124 A | * | 9/1982 | Faller .......................... 220/453 |
| 4,442,969 A | * | 4/1984 | Holden ..................... 229/2.5 R |
| 5,040,328 A | | 8/1991 | Coon |
| 5,709,167 A | * | 1/1998 | Kelley .......................... 119/61 |
| 6,016,627 A | | 1/2000 | Nobile |
| 2002/0005012 A1 | * | 1/2002 | Cochran ...................... 47/66.5 |
| 2002/0007593 A1 | * | 1/2002 | Mischo .......................... 47/86 |

FOREIGN PATENT DOCUMENTS

GB 2098044 A * 5/1982 ............ A01G/9/02

* cited by examiner

Primary Examiner—Peter M. Poon
Assistant Examiner—Andrea M. Valenti

(57) ABSTRACT

This invention provides a tray liner that is insertable into a mushroom-growing tray. This invention provides a tray liner that provides protection to the mushroom-growing tray by eliminating direct contact of the growing medium or compost with the trays' interior wood The tray liner has a rectangular base member with a periphery of upstanding sidewalls joined to the base portion. There is a notch section located at each corner of the rectangular base member that accommodates an upstanding corner frame member located at each corner of the wooden mushroom growing tray. The notch section has a contiguous wall that is joined with the periphery of upstanding sidewalls and the base member. An alternative embodiment is to provide a replaceable mushroom growing tray liner that comprises a plurality of sections.

7 Claims, 16 Drawing Sheets

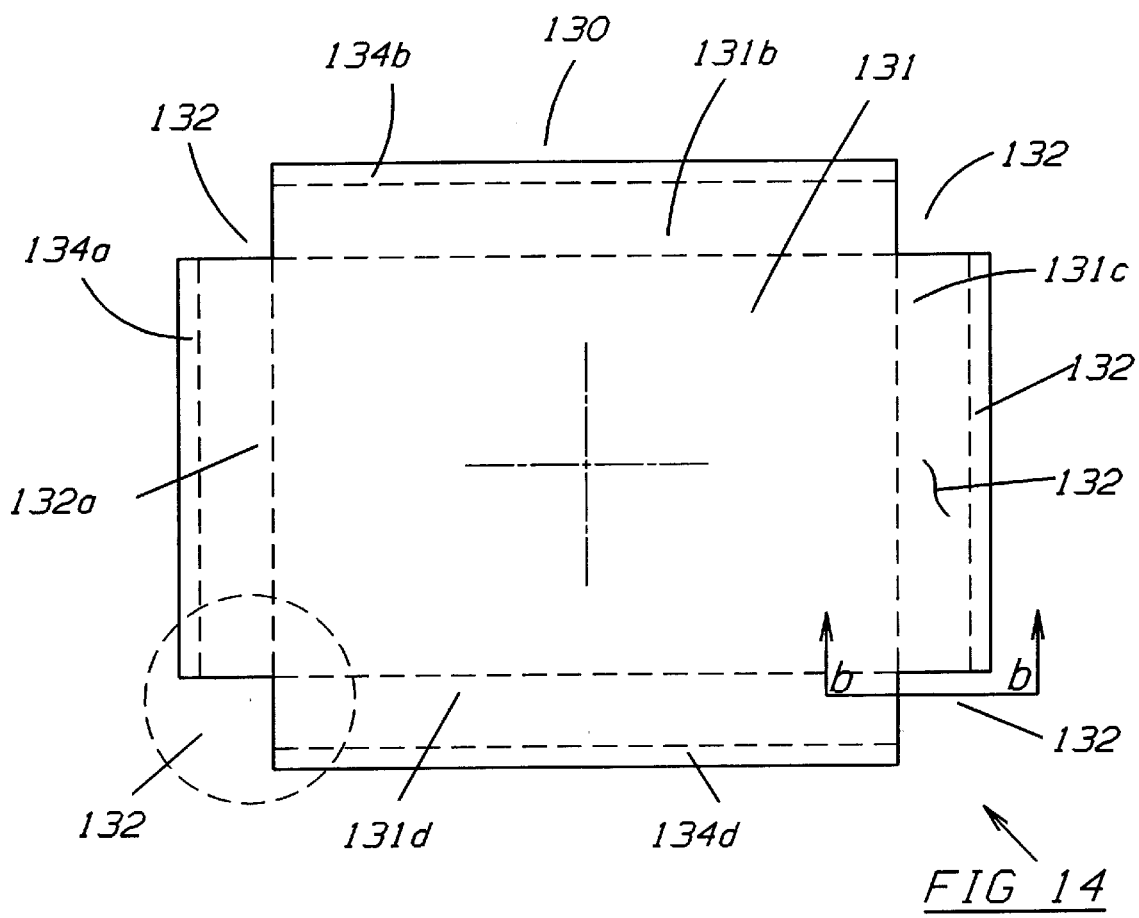
FIG 14
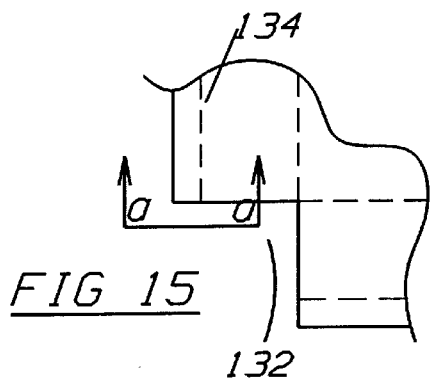
FIG 15
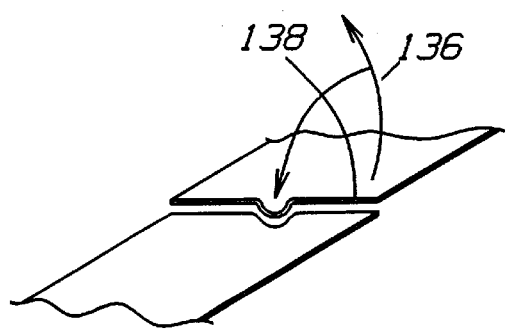
FIG 17
FIG 16

RECYCLABLE TRAY LINERS FOR WOODEN MUSHROOM-GROWING TRAYS

TECHNICAL FIELD

This invention is a low-cost, recyclable, easily replaceable vacuum or thermoformed insert or liner for mushroom-growing trays that are assembled or formed of wood or composites of wood or recyclable materials that may be subject to deterioration by rot or use.

BACKGROUND OF THE INVENTION

It is common practice in the mushroom growing industry to grow mushrooms in large wooden trays. Typically, mushroom-growing trays have commonly been made out of either oak or pressure-treated wood.

Wood is fairly durable and inexpensive however there may also have been an effort to manufacture the mushroom trays from other materials such as pressboard or recycled cardboard or paper. The typical wooden mushroom trays are tough enough to withstand the forces incurred when transported by forklift trucks, and a common wood used to fabricate them is oak. Typically, wooden mushroom trays are stacked to create multiple levels of trays within the same amount of floor space, as one tray would occupy. By stacking the growing trays in tiers, a larger number of mushrooms in a concentrated area can be cultivated.

However, the use of wooden trays or the like has several disadvantages. For example, wooden trays are difficult to clean at the end of each growing cycle. During and after the cleaning process, the porous wood becomes moisture-swollen and its fibrous surface traps spent compost material. Since the growing medium remains embedded in the wood fibers after the tray has been emptied, the wood begins to rot, which weakens the overall structure of the tray, thereby shortening its useful life. Another undesirable feature is that detrimental molds may propagate in the new growing medium, causing contamination that could result in diminished yield for any particular crop.

Alternate mushroom tray designs (metal, plastic, and composite) have been developed in an attempt to overcome the above-mentioned disadvantages.

The invention disclosed in U.S. Pat. No. 5,040,328 to Coon discloses a mushroom tray fabricated from a plastic that has downward-opening channels and is secured to a support structure made of corrosion-resistant material. Following the assembly of this unit, this tray is filled with mushroom growing material. There is also a plurality of clips to secure the plastic tray to the aluminum support. The '328 patent disclosing the mushroom tray describes a non-porous surface in its construction, thereby eliminating wood rot or mold growth in the structure. The '328 reference apparently is intended to provide a mushroom tray that will possess the requisite strength to withstand resulting vertical load and associated forces when multiple trays are stacked, as well as other forces endured during transportation or movement of the trays. In order to overcome some disadvantages of mushroom trays such as that described in the '328 reference, U.S. Pat. No. 6,016,627, to Nobile discloses a stackable composite mushroom-growing tray. The '627 reference discloses a structure fabricated out of a glass-reinforced plastic composite. The structure of the tray is uniquely molded to include a bottom surface having graduated height ribs and corrugations extending perpendicular to the ribs to improve rigidity. There is also a plurality of holes and specially molded recesses for the spacers necessary for stacking multiple trays. A disadvantage of this type of system may be the expense of manufacture due to the elaborate materials and details that need to be molded into the structure, which are accomplished through use of an expensive mold.

Accordingly, there is a need for a more cost-effective method to improve the clean-out capabilities and increase the lifespan of wooden mushroom-growing trays that are formed of various wood materials or the combination thereof from recycled, manufactured, or remanufactured biodegradable materials. Additionally, a benefit is that, when used in trays constructed with chemically pressure-treated wood, the tray liner will provide a protective layer between the treated wood tray and the growing medium. The U.S. Environmental Protection Agency (EPA) recently announced that wood treated with CCA (chromated copper arsenate) will be banned from residential use by January 2004. If this ban is extended to the food-growing industry, the liner may prove to be highly beneficial in protecting untreated wood growing trays (or growing trays constructed of biodegradable materials) from the wood-decaying effects of the growing medium. This will be shown in the following detailed specification of the present invention that provides an easily manufactured, protective and cost effective tray liner for mushroom-growing trays.

SUMMARY OF THE INVENTION

The present invention concerns a tray liner that is insertable into a mushroom growing tray. The tray liner is formed as a rectangular base member with a periphery of upstanding sidewalls joined to a base portion. There is a notched section located at each corner of the rectangular base member to accommodate the upstanding frame member located at each corner of the wooden mushroom-growing tray. The notch section has a contiguous wall that is joined with the periphery of upstanding sidewalls and the base member.

This invention has advantages over the prior art by providing an inexpensive, replaceable, and fully recyclable tray—insert (hereinafter referred to as "tray liner") for existing wooden mushroom growing trays. Once installed, the tray liner could remain in a wooden mushroom-growing tray for the life of that tray which Will extend the usefulness of such growing trays. The tray liner as conceived in the present invention could even be reused in a new wooden tray when the original wooden tray has come to the end of its useful life.

A feature of the present invention is that the smooth radius corners that result from this one-piece tray liner as manufactured eliminates or reduces the sharp corners of the wood constructed tray. The manufacturing process is simple, and provides a smooth textured mushroom-tray liner that is easy to fabricate, handle and install. The smooth surface of the material of the tray liner facilitates the cleaning of spent material such as old growing medium from the lined wooden mushroom-growing tray at the end of each growing cycle. One of several alternative embodiments of the present invention is included to provide a replaceable tray liner that comprises a plurality of similarly shaped sections that may be installed in sections to a mushroom-growing tray. This alternate design provides additional lower manufacturing and/or shipping costs and easier handling for the mushroom grower.

BRIEF DESCRIPTION OF THE DRAWINGS

FIG. 14 is a plan view of an alternate embodiment of a plain version of a tray liner as shown in a pre-formed manufacturing blank stage that may be used instead of a vacuum forming process.

FIG. 15 is an enlarged version of one corner of the embodiment of FIG. 14 showing a detail of the blank manufacturing process of the tray liner.

FIG. 16 is a view taken along the lines of a—a from FIG. 15, showing one method of having a bendable section of the blank by use of a compressed area of the blank material illustrated in FIG. 14.

FIG. 17 is a view taken along the lines of b—b from FIG. 14, showing a compressed area of the blank material to achieve a bendable section for forming the tray liner from the blank material.

DETAILED DESCRIPTION OF THE PRESENT INVENTION

Figure 1:
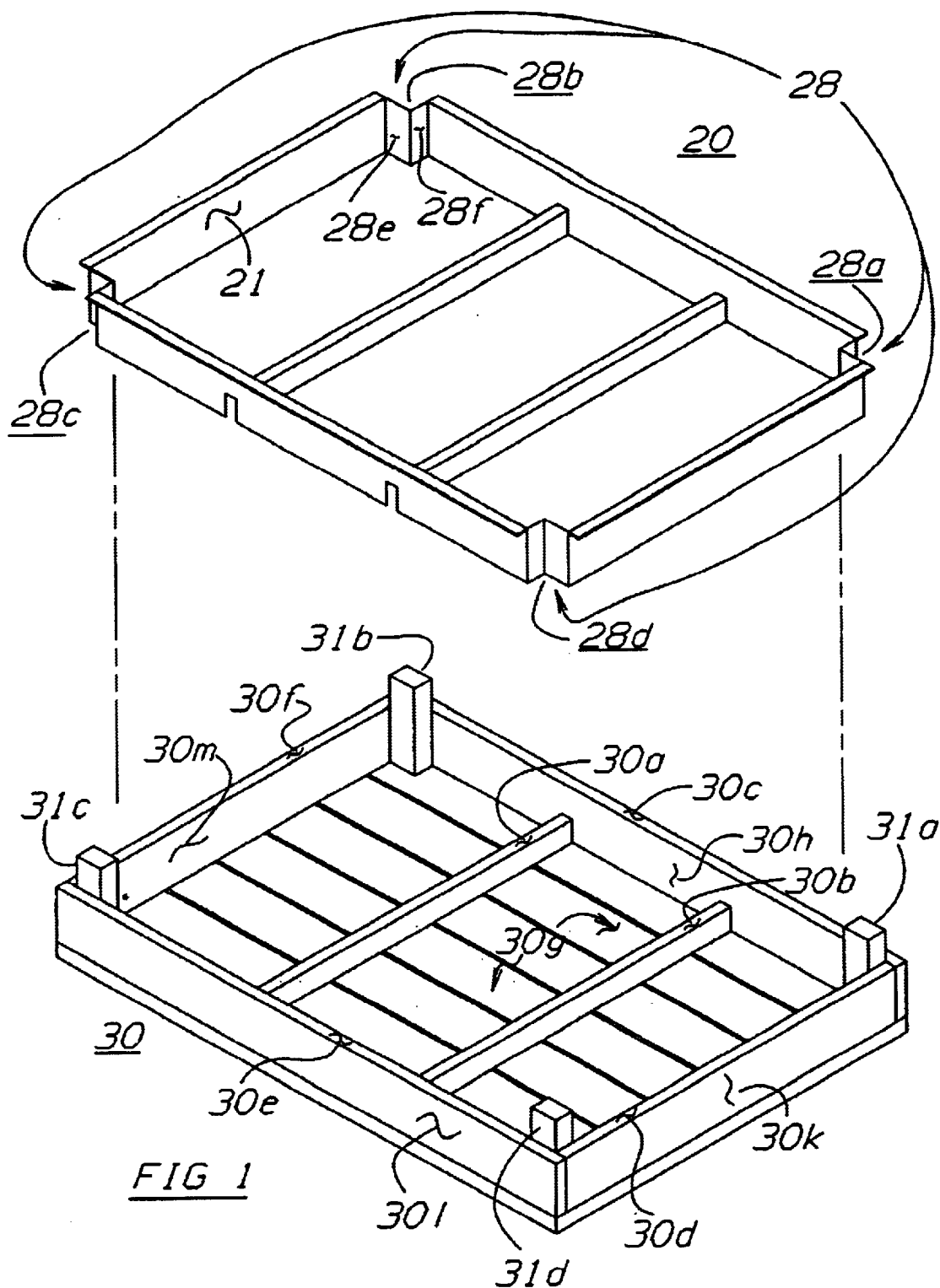
FIG. 1 is a perspective view illustrating a tray liner removed from a wooden mushroom-growing tray.

In describing the present invention, reference is made to the drawings, wherein there is seen in FIG. 1, a perspective view of a replaceable tray liner 20 that is shown as it is positioned over a wooden mushroom growing tray 30. The replaceable tray liner 20 is a simple, inexpensive liner manufactured to fit directly into existing wooden mushroom-growing trays or into alternative, existing or newly fabricated mushroom-growing trays that may be manufactured from recycled and biodegradable or other pressed wooden material that is typically manufactured and used for building materials in a variety of applications today.

The replaceable tray liner 20 is made of a one-piece material, such as polyethylene, polystyrene, polypropylene, polyethylene terephthalate, or other suitable thermo/vacuum formable poly-material. The material defined above is in the range of 0.020"–0.040" thickness. The thickness can vary to suitcustomer requirements, material forming properties and manufacturing processes. The tray liner 20 is recyclable, for current conditions where recycling is.important, conceived to achieve this important factor. For example, in the embodiment shown in FIG. 1, a high-density polyethylene material is chosen for: its physical properties. When the wooden mushroom-growing tray 30 or an equivalent biodegradable and recyclable constructed mushroom-growing tray has come to the end of its life, its tray liner may be either reused in a new wooden tray or disposed of and replaced with a new tray liner. Since these tray liners are 100% recyclable, disposal is easy and inexpensive—a great advantage in today's business climate.

Manufacturing of the replaceable tray liner 20 may be accomplished by means of a thermo/vacuum forming process, as is the case for similar commercial products using plastic materials such as those described above. The costs of thermo/vacuum molds are relatively inexpensive and thus lend themselves to various sizes and shapes of construction.

Figure 2:
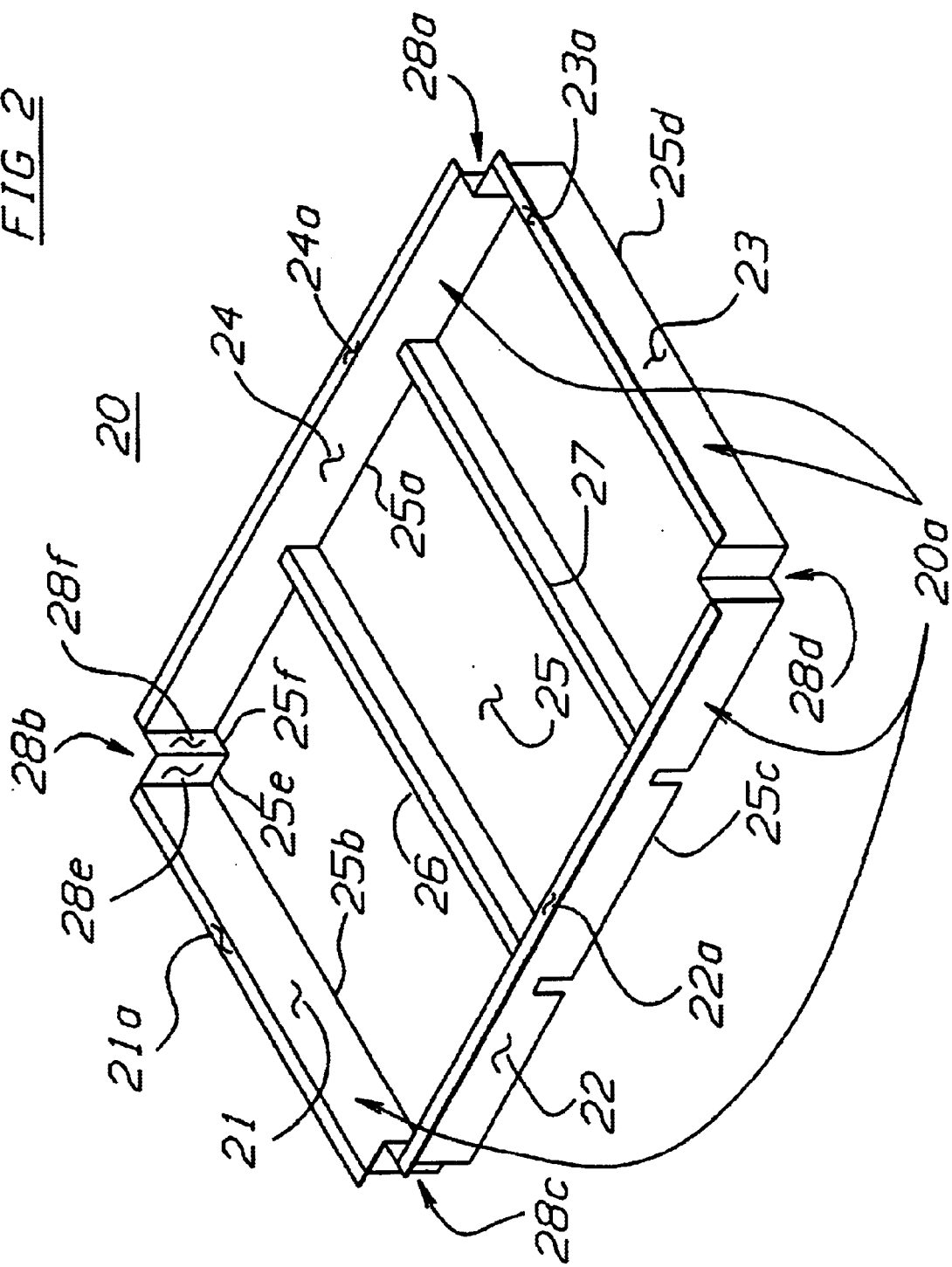
FIG. 2 is a perspective view of the inventive tray liner.

Referring now to FIG. 1 and 2, the replaceable tray liner 20 is described in more detail in reference to its construction. In FIG. 1, the replaceable tray liner 20 is shown, as it is ready to be inserted into the wooden mushroom-growing tray 30. In FIG. 2, the tray liner 20 is shown by itself wherein there is a periphery of upstanding sidewalls 20a. These include two opposing upstanding sidewalls 22, 24 and two opposing upstanding end walls 21, 23, both of which comprise the major side portions of the box-like structure of the tray liner 20. The side and end walls 22, 24 and 21, 23 are all respectively joined to a substantially rectangular base member 25 at base corners 25a, 25b, 25c and 25d, which intersect the aforementioned side and end walls and the base member 25.

Referring again to FIG. 2, there is a pair of upstanding, reinforcing bridge members 26, 27 that are formed from the base member 25 and joined to the opposing sidewalls 22, 24. The bridge members 26, 27 are formed in the tray liner 20 to cover and accommodate corresponding reinforcing bridge members 30a, 30b (FIG. 1) of the wooden tray 30.

Referring back to FIG. 1, the tray liner 20 has a plurality of notch sections 28, specifically noted as a notch section 28a, 28b, 28c and 28d, all of which are located at the major outside corners of the tray liner 20. The construction and juncture of the upstanding walls surrounding the notch sections 28a, 28b, 28c and 28d is typical in that the walls are joined to the periphery of upstanding walls 20a (FIG. 2), thereby forming a contiguous and continuous construction. For example, there is an upstanding wall 28e, 28f that forms part of the perimeter of upstanding wall around the notch section 28b; the wall 28e, 28f both being contiguous and joined to the accompanying sidewalls 21, 24, and to the base member 25 at a bottom intersection corner 25e, 25f (FIG. 2).

The upstanding walls for notch sections 28a, 28c, and 28d are formed similarly to upstanding walls 28e, 28f to cover that inside corresponding portion of the upstanding corner frame members such as 31a, 31b, 31c and 31d (FIG. 1), respectively, thereby offering protection to the wooden tray 30 in that area.

In FIG. 2, the tray liner 20 additionally has optional outward facing lips 21a, 22a, 23a and 24a which all are respectively contiguously joined to their respective upstanding walls 21, 22, 23 and 24 to form stiffening and stabilizing construction of the tray liner 20. This may aid in the handling and stacking of multiple tray liners 20 together at the time of manufacture, as well as when installing the tray liners 20 in a wooden tray 30. The outward facing lips 21a, 22a, 23a, 24a also provide protection to a top surface 30c, 30d, 30e and 30f (FIG. 1) of the wooden tray 30. In addition, once installed in the wooden tray 30, the tray liner 20 can be easily separated from the wooden tray 30 by grasping the outward facing lips 21a, 22a, 23a, and 24a. It is also possible to manufacture the tray liner 20 without the outward facing lips 21a, 22a, 23a and 24a at less expense, if desired.

Other parts of the wooden tray 30 (FIG. 1) include a bottom surface 30g and a periphery of upstanding sidewalls 30h, 30k, 30l and 30m. The sidewalls 30h, 30k, 30l and 30m are all joined to the upstanding corner frame-members 31a, 31b, 31c and 31d respectively. For example, sidewalls 30h, 30k join and are suitably secured to the corner member 31a. The remaining upstanding corner frame members 31b, 31c and 31d are similarly joined to their respective upstanding sidewalls 30h & 30m, 30l & 30m, and 30l & 30k, as will be understood by those skilled in the art. It will be apparent that the general construction of the tray liner 20 will suitably cover the defined parts and components of the wooden tray 30 as defined above, with the exception of the top portions of the upstanding corner frame members 31a, 31b, 31c and 31d. The liner covers these corner members only up to the height of the sidewalls 30h, 30k, 30l and 30m.

Figure 3:
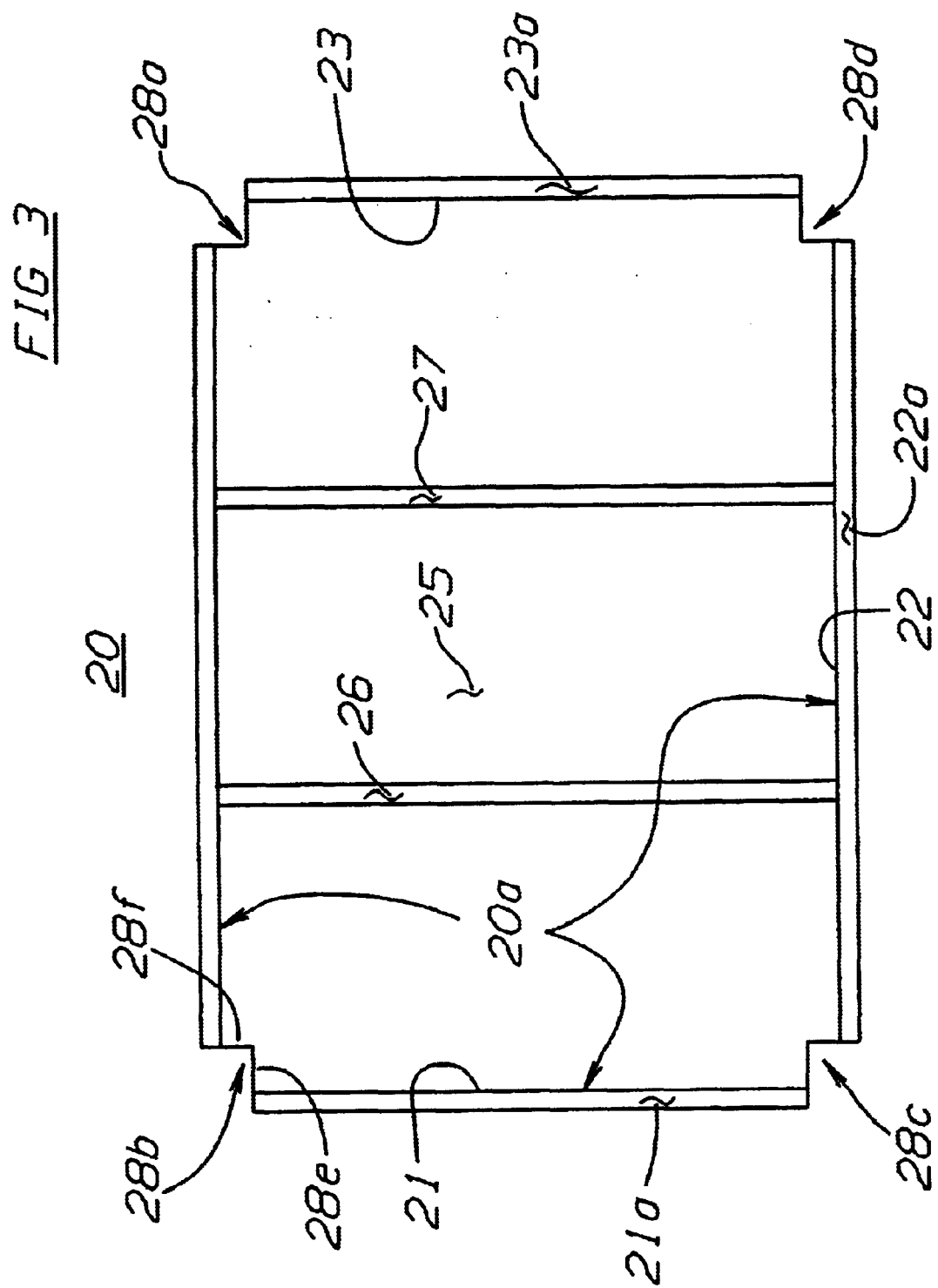
FIG. 3 is a plan view of a replaceable tray liner.

Generally, referring to FIG. 1, FIG. 2 and FIG. 3, the tray liner 20 is manufactured to dimensions that are known in the field by those companies that make their specific wooden tray 30. For example, the tray liner 20 is manufactured to fit such a wooden tray 30 in dimensions that are approximately constructed to suit the following sizes: two feet by four feet; four feet by four feet, four feet by six feet, four feet by eight feet, or any other size that is commercially acceptable to those companies that manufacture such wooden trays. The present example of the wooden tray 30 is, for purposes of description in this specification, four feet by six feet, and, accordingly, the tray liner 20 is designed to fit inside of the dimensions of the wooden tray 30.

Figure 4:
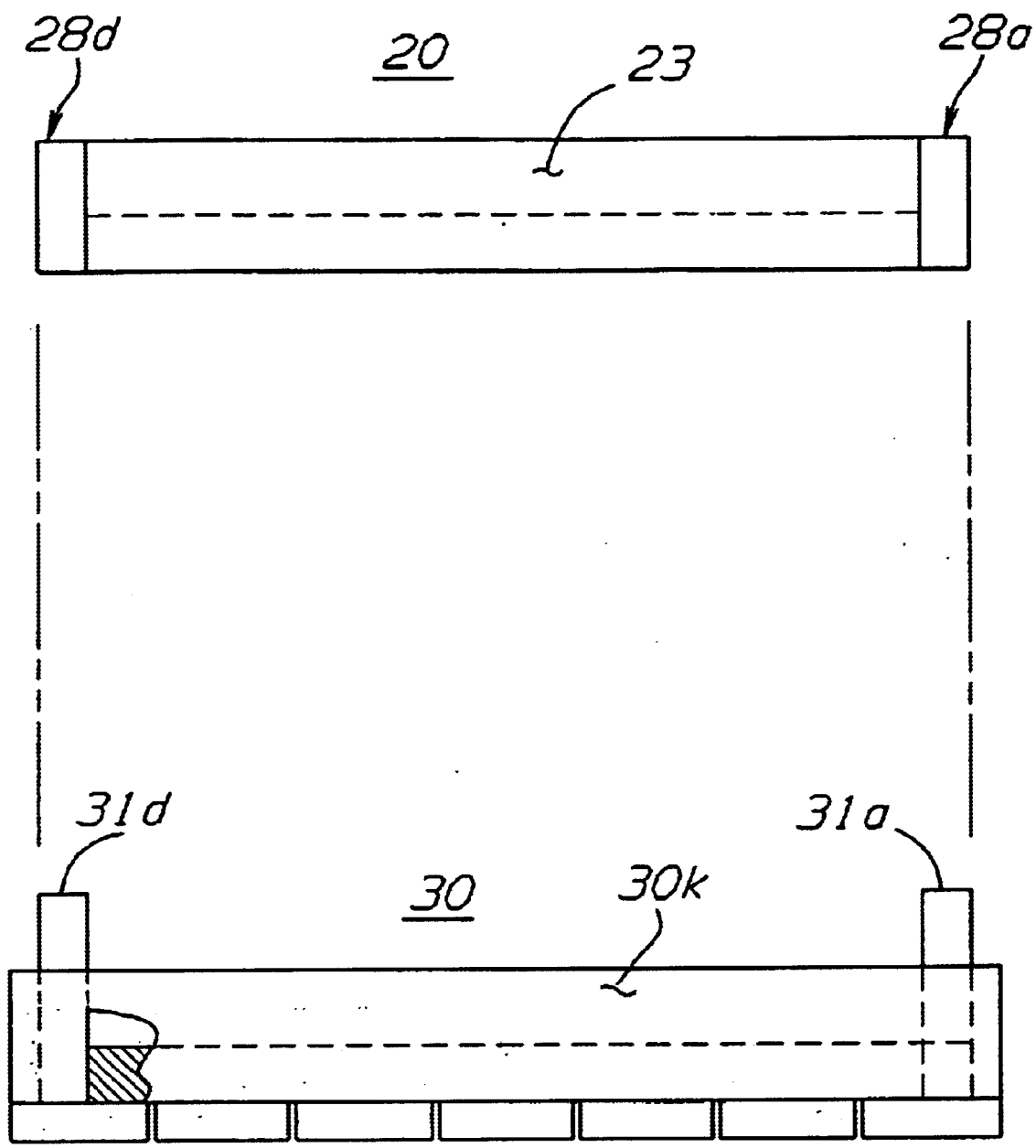
FIG. 4 is an end elevation view of the tray liner removed from the wooden mushroom-growing tray.
Figure 5:
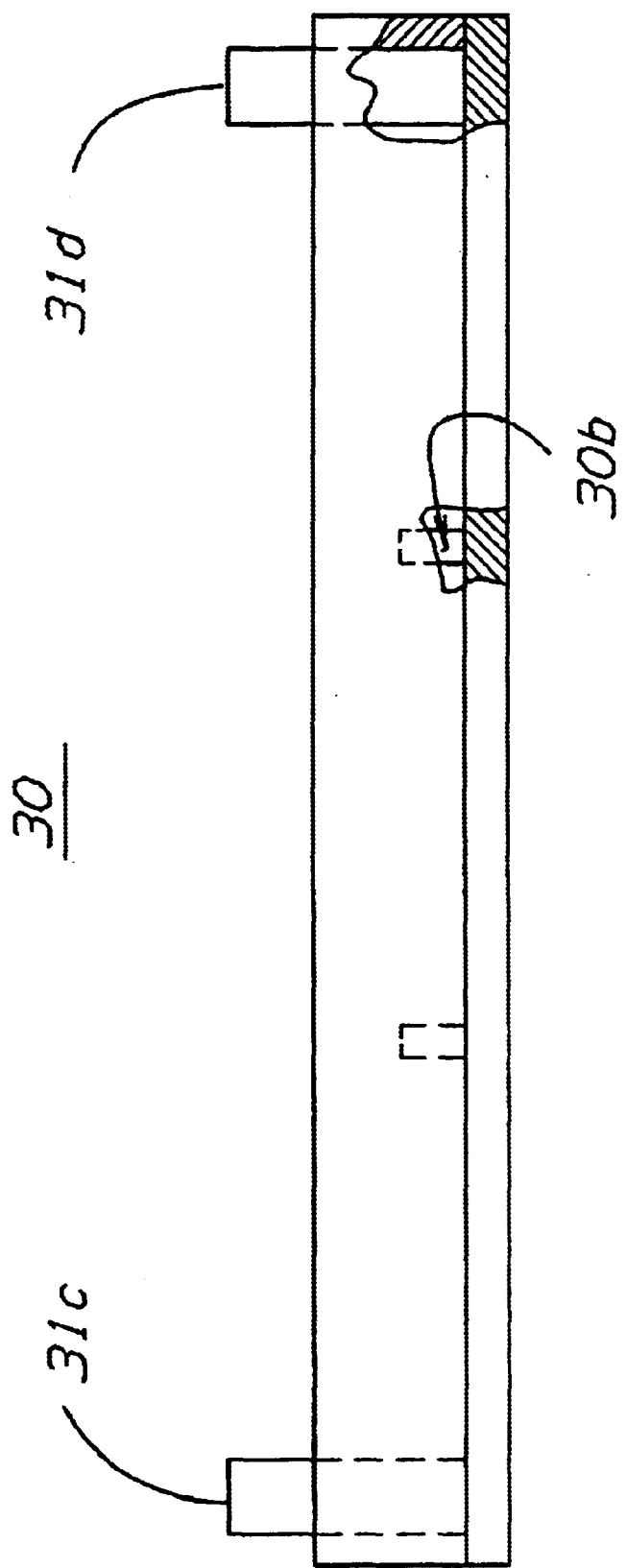
FIG. 5 is a side elevation view of the wooden mushroom-growing tray, which illustrates a way to stack one mushroom-growing tray upon another.

FIG. 4 and FIG. 5 are additional views of the assembly and relationship of the tray liner 20 and the wooden tray 30. FIG. 4 shows the relationship of tray liner 20 with a wooden tray 30 having upstanding corner frame members 41a, 41d at a height greater than the height of the wall 30k. It is to be understood that each corner frame member for this example would be the same height. FIG. 5 shows a way to assemble the wooden mushroom-growing trays to one another in a stack.

Figure 6:
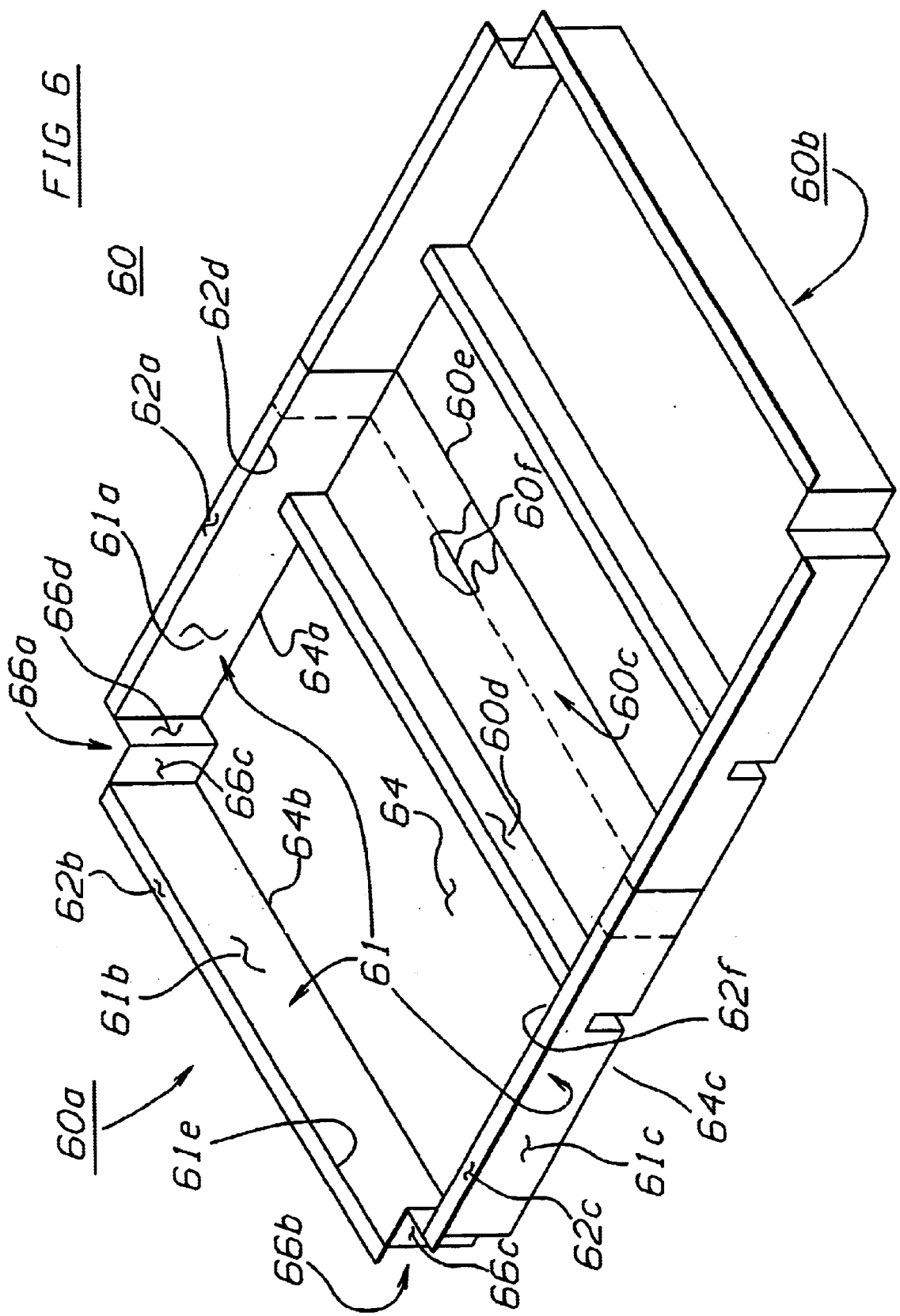
FIG. 6 is a perspective view of the inventive tray liner comprising two similar sections.

Referring to FIG. 6, a perspective view is shown of an alternative embodiment and construction of a replaceable tray liner 60. The tray liner assembly 60 will be understood to be similar to the tray liner 20 and as such will be adaptable to fitting into the wooden tray 30 previously described. In FIG. 6, the liner assembly 60 is composed of two tray liner sections 60a, 60b that are overlapped at an area 60c. This may be considered a two-part design and therefore is an assembly as such. The alternate construction and assembly shown in FIG. 6 and 7 may be desirable for those companies that manufacture or use wooden mushroom growing trays having large variations of dimensional tolerances of construction.

The tray liner sections 60a and 60b are the same part or component and may be made so that each will fit the wooden tray 30 in two different directions by overlapping them at a desired point such as the area 60c. FIG. 6 of the present alternate embodiment illustrates a construction that will fit width wise in reference to the wooden tray 30. Alternatively, it will be understood by those skilled in the art that the tray liner sections 60a, 60b may be constructed in a second or alternate direction that will fit the wooden tray 30 in a configuration that will overlap as shown overlapping at the area in a lengthwise direction in the drawing of FIG. 7.

Referring to FIG. 6, the liner section 60a is constructed with a periphery of three upstanding sidewalls 61 that are comprised of an upstanding wall 61a, 61b and 61c. The walls 61a, 61b and 61c are all joined to a base portion 64 of the tray liner 60a, at corner junctures 64a, 64b and 64c, thereby forming a complete and contiguous construction of the liner section 60a with three upstanding walls, as opposed to the four walls described previously with reference to the tray liner 20 and a flat end 60c. The rectangular.base member 64 has a contiguous edge defining a flat end 60c of the base member 64 of the tray liner 60a, the flat end 60c not having an upstanding side wall whereas a remainder of the rectangular base member 64 has the upstanding side walls 61a, 61b, and 61c located around a periphery formed of three sides of the substantially rectangular base member 64.

The tray liner 60a additionally has an upstanding bridge member 60d that is formed from the base portion 64 and is joined to the upstanding walls 61a, 61c. The upstanding bridge member 60d is designed to cover the upstanding bridge member 30a or 30b (FIG. 1) as the case may be, since the liner sections 60a and 60b are symmetrical and therefore reversible to cover the wooden tray 30 with the associated components described above.

Referring to FIG. 6, it will be apparent that when the liner sections 60a, 60b are inserted into the wooden tray 30 described in reference to FIG. 1, the liner sections 60a and 60b will cover exposed sections of the wooden tray 30 such as those described previously. For example, the bottom surface 30g of the wooden tray (FIG. 1), the upstanding reinforcing bridge members 30a, 30b, and accompanying top surfaces 30c, 30d, 30e and 30f of the upstanding walls are covered by the combination of liner sections 60a and 60b when inserted into the wooden tray 30.

The flat end 60c defined in FIG. 6 is illustrated in overlapping or seamed relationship, but could also be in an abutting relationship (not shown) between an edge 60e and 60f of the two liner sections 60a, 60b. It is an objective to cover sufficient areas of the wooden tray 30, and such an abutting relationship would create a minimal gap and potential exposure of the bottom surface 30g of the wooden tray 30.

Describing the liner section 60a further (FIG. 6), the upstanding side walls 61a, 61b and 61c are contiguous and formed with an outward facing lip 62a, 62b and 62c that are constructed and formed as part of the walls defined above being joined at a corner 62d, 62e and 62f there between. There is a notch section 66a, 66b with in the construction of the liner section 60a that will accommodate the upstanding corner frame members 31a, 31b of the wooden tray 30 when the liner section 60a is inserted into the wooden tray 30. The notch sections 66a, 66b are formed from upstanding walls such as an upstanding wall 66c and 66d associated with the notch section 66a and 66b. The walls 66c, 66d are formed so as to be contiguous with the upstanding walls 61a, 61b being joined at intersections with the base portion 64 and so forth in a similar manner as that described with reference to the tray liner 20.

To briefly restate.some of the details and benefits described above, it is desirable to have a replaceable tray liner that is designed as a substitutable one-component liner or a combination of multiple liner sections. It may be a matter of design choice or of economic factors that the same part can be used for both sections, as in the case of the two-part design described above which is symmetrical. This configuration could lower both manufacturing costs (since a smaller mold could be used) and transportation costs (since the smaller insert sections could be shipped via standard parcel carrier).

To restate, with reference to the two-part design, both liner sections 60a, 60b are identical and thus replaceable at either end of the wooden tray 30 while also being accommodating to possible tolerance variations in the construction of the a wooden tray 30.

Another embodiment of the present tray liner design involves further consideration of possible tolerance variations in the construction of wooden mushroom trays such as tray 30. In this case, there is, in reference to FIG. 7, an embodiment of the present invention whereby the tray liner is manufactured in quarter sections. Again taking advantage of symmetry, there is, a tray liner 70 comprising equally dimensioned liner sections 70a, 70b, 70c and 70d that form a combination of a suitable replacement tray liner similar to that defined above with reference to the tray liners 20 and 60a, 60b. In the case of the tray liner 70, each of the liner sections 70a, 70b, 70c and 70d comprise at least one fourth of the size of the wooden tray 30. Diagonally opposing liner sections 70a, 70c as well as sections 70b, 70d have symmetry thereby limiting the necessity of separate molds for the formation of all four of the sections defined above. The liner sections 70a, 70c are the same, and the liner sections 70b, 70d are similarly constructed, thereby requiring two-forming molds instead of the one mold that would accommodate the previously described liner 20, 60a, and 60b. (Liner sections 70a, 70d may be considered "right hand," while liner sections 70b, 70c may be considered to be "left hand" because of the reversing corner design).

Figure 7:
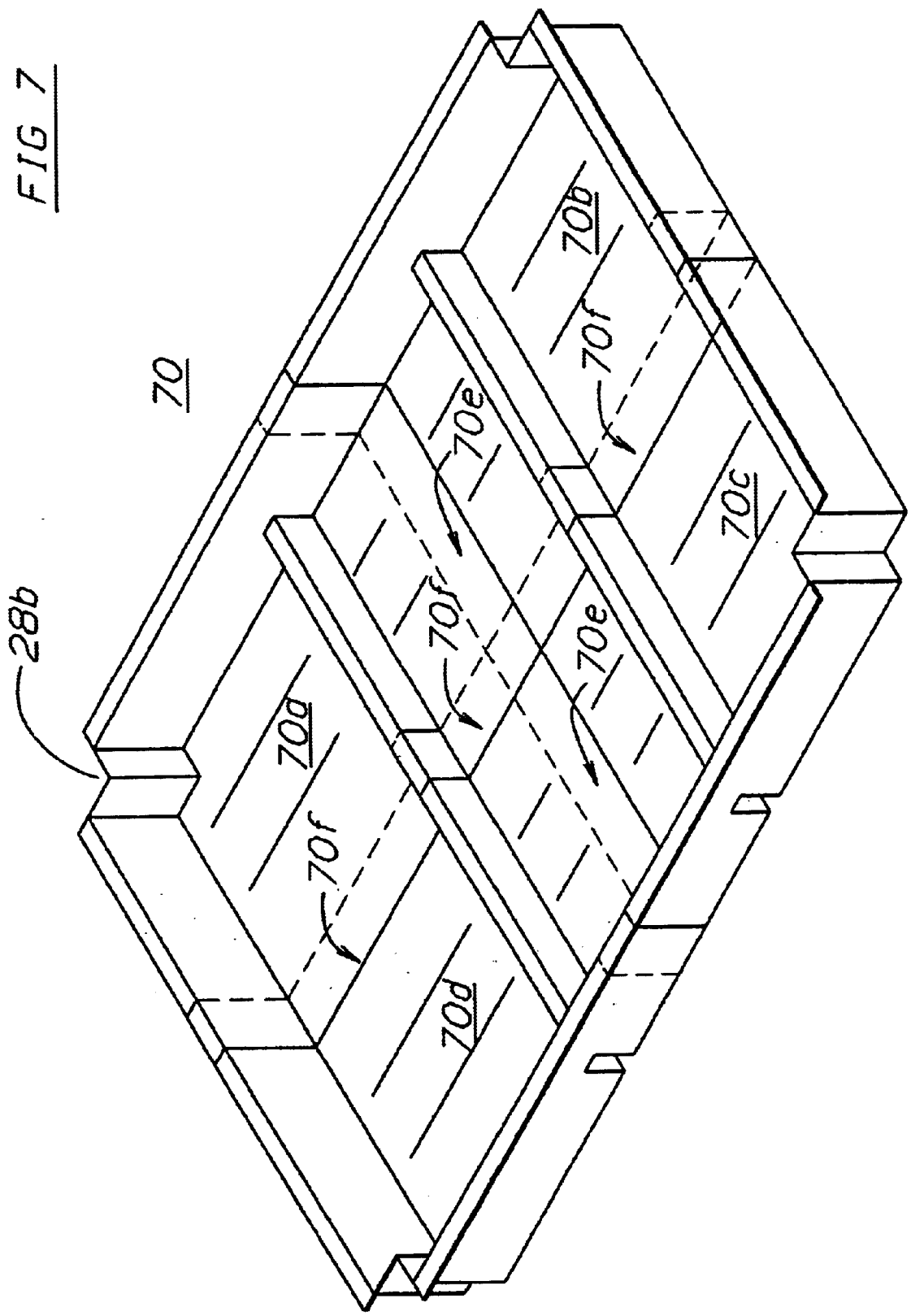
FIG. 7 is a perspective view of an alternate embodiment of the inventive tray liner having four removable sections where there are two similar sections for installing into alternating corners of a mushroom-growing tray.

The insertion of the liner sections 70a, 70b, 70c and 70d create an overlapping seam 70e with an adjoining and adjacent section. For example, seam 70e is created by the placement of the liner section 70a adjacent to or overlapping liner section 70b along with the placement of liner section 70c adjacent to or overlapping liner section 70d. An overlapping seam 70f is created by the overlapping of liner sections 70a and 70b in addition to the overlapping of liner sections 70c and 70d. Likewise, the overlapping of liner sections 70a, 70b, 70c and 70d creates overlapping portion 70h. The previously defined replaceable liner sections 60a, 60b and the liner sections 70a, 70b, 70c, and 70d exemplify the possible variations of sizes that can be manufactured in sections or parts that may be utilized to accommodate standard wooden trays such as the tray 30. The tray liners defined will create an entire replaceable liner capability that will be adaptable to the commercial industry of mushroom growing. The sectional approach to the design of the liners is desirable in order to accommodate variations as a defined above in manufacture of the wooden trays and to possibly lower manufacturing and/or shipping costs. The sectional liners defined above may be manufactured in a latitudinal x-direction or a longitudinal y-direction as shown in FIG. 6 and FIG. 7.

Figure 8:
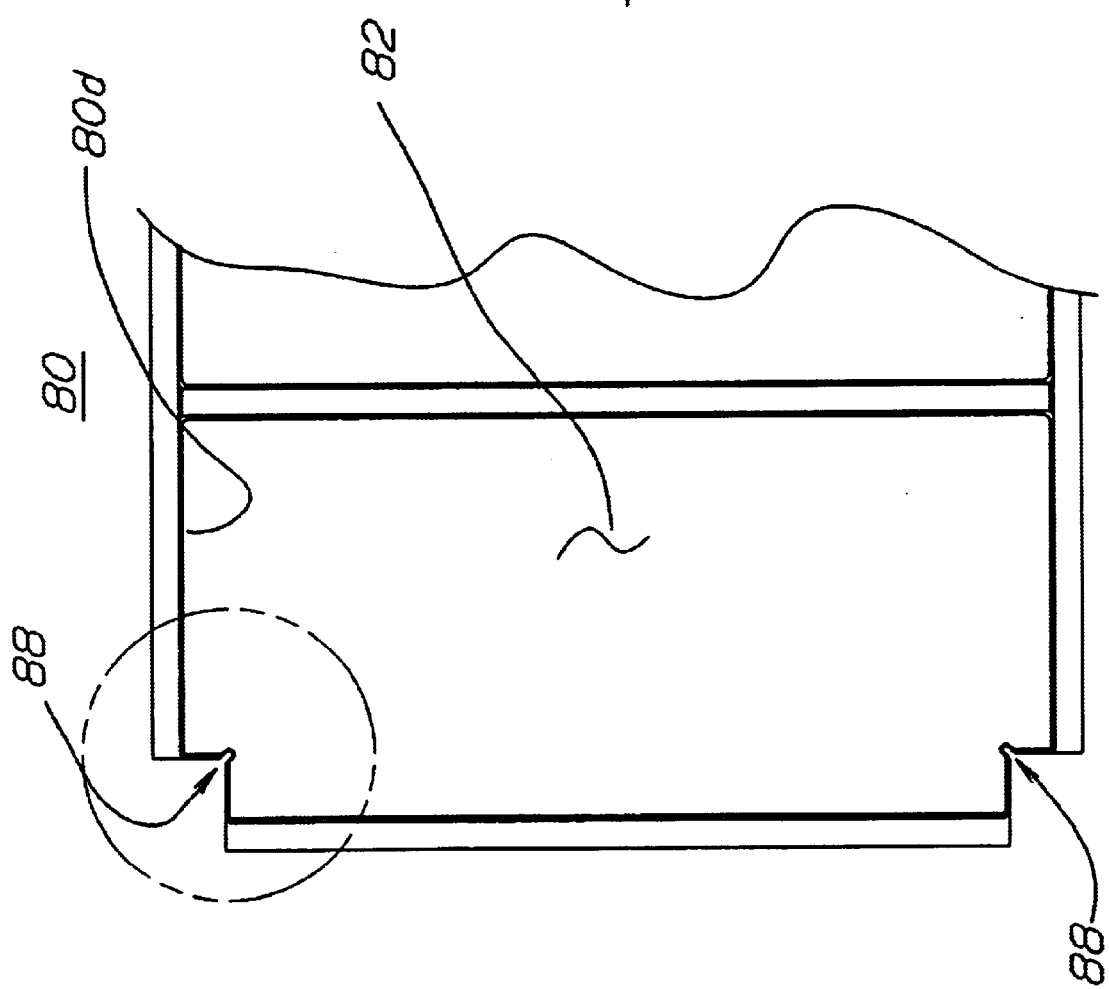
FIG. 8 is a fragmentary planar view of the inventive tray liner.
Figure 9:
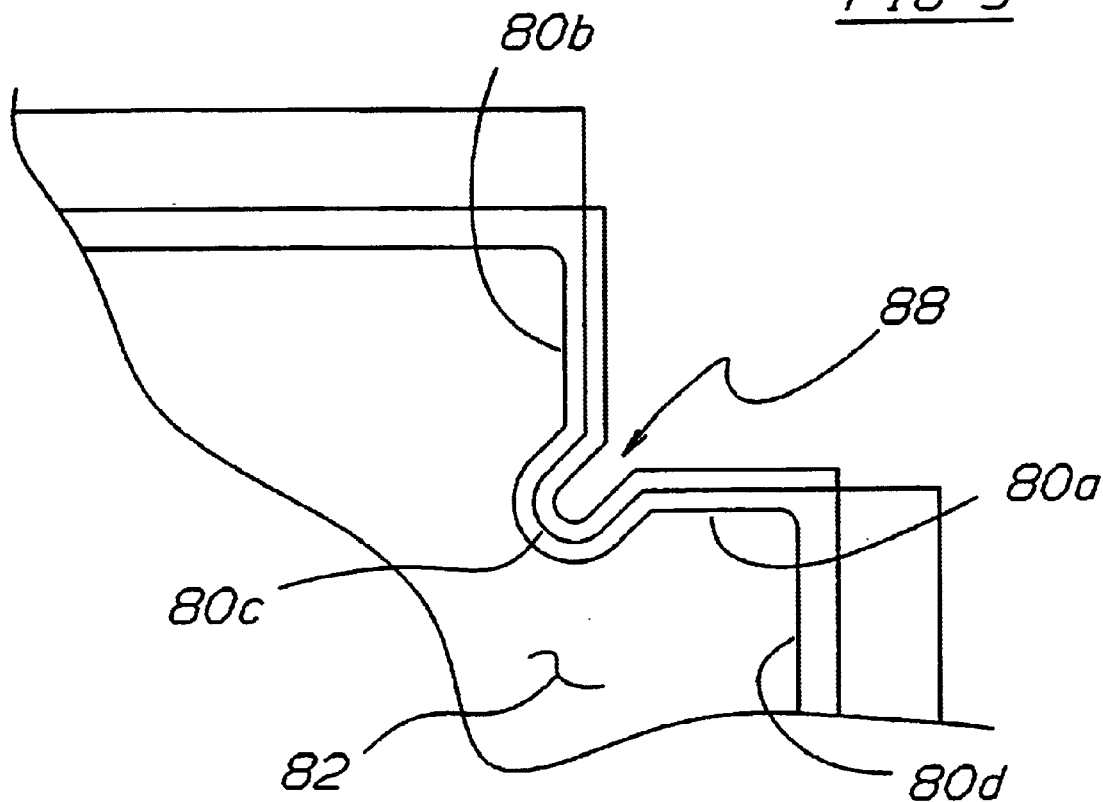
FIG. 9 is a fragmentary planar view of the corner of the tray liner.

Another feature of the present invention will now be described while referring to FIG. 8, 9 and 10. In FIG. 8, an alternate construction of a notch section of a replaceable tray liner 80 is defined, wherein one end of the tray liner 80 is shown, and may be considered as a substitute for that described above in reference to the liner 20, liner section 60a and liner section 60b, or liner sections 70a, 70b, 70c, and 70d. The objective is to fabricate the liner 80 for additional tolerance absorbing capability as may be necessary to fit some of the commercial wooden trays 30 defined herein. In the present invention, the tray liner 80 has a notch section 88 that is located at each of four corners (two of which are shown in FIG. 8). The notch section 88 will be.understood to be similar to that defined above in that it will clear or fit the liner 80 to the wooden tray 30 and the upstanding corner frame members 31a, 31b, etc as defined above in reference to the wooden tray 30. The notch section 88 is similarly constructed by virtue of adjoined upstanding wall members such as those defined in regards to the liner 20, with an exception regarding a compliant feature, which is now described. Referring to FIG. 9, an enlargement of the notch section 88 is illustrated in that there are upstanding walls 80a and 80b that are joined to a base portion 82 of the liner 88, thereby forming a continuous and contiguous periphery of upstanding walls as described previously in reference to the liner 20.

The upstanding wall 80a, 80b are contiguous and joined together with a compliant semi-circular notch section 80c that is blended into the wall 80a and 80b. It will be understood that the semi-circular form 80c is designed to act as a spring like or compliant portion of the upstanding walls that will "give" (i.e., flex) when the tray liner 80 is inserted into the wooden tray 30. The design of the semi-circular form 80c defined above may be alternately shaped in many forms (elliptical, bulbous, etc) that will "give," or be resilient, in regards to possible tolerance variations to be expected in wood construction of mushroom growing trays.

Figure 10:
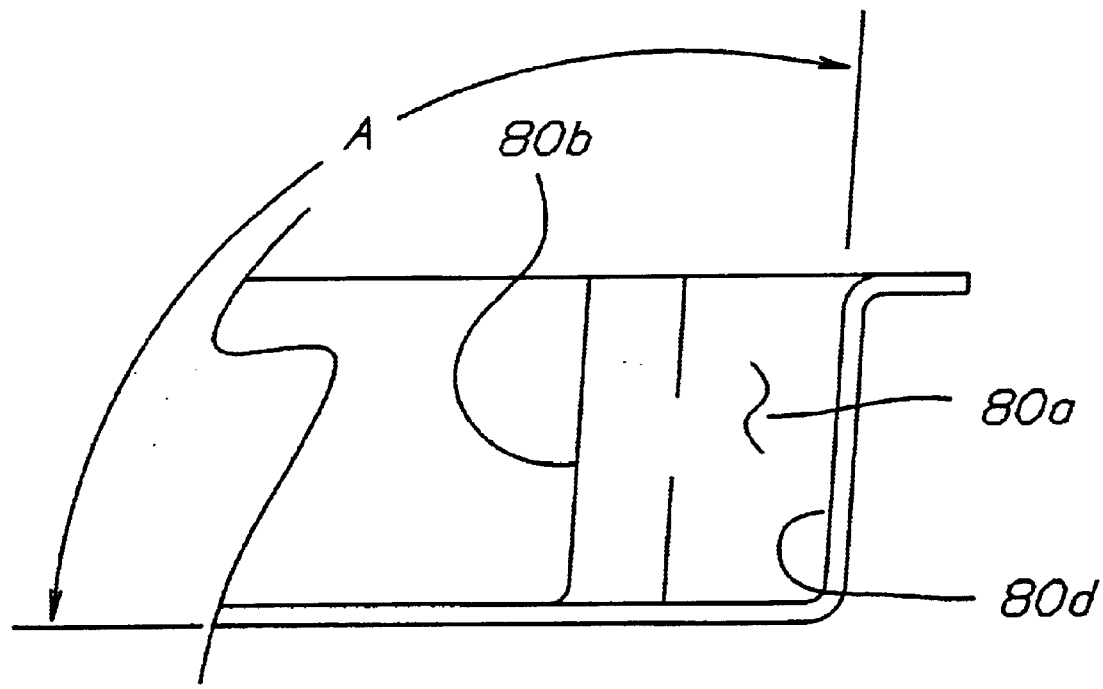
FIG. 10 is an elevation view of the inventive tray liner.

To reinforce the suitability of manufacturing the aforementioned liners 20, 60a, 60b, and 80, in FIG. 10 is shown another aspect of the manufacturing design contemplated. The liner 80 is illustrated in an elevation view and there is a taper greater than 90 degrees (outwardly tapered) shown by the reference angle A. The angle A would be appropriate in a 91–94 degree range as measured to form an obtuse angle from the base portion 82 of the liner 80 to an upstanding wall 80d. It will be recognized by those skilled in the art that this type of construction is desirable for manufacturing and is applied to all upstanding walls of the foregoing described liners 20, 60a and 60b, 70a, 70b, 70c, and 70d, and 80.

Figure 11:
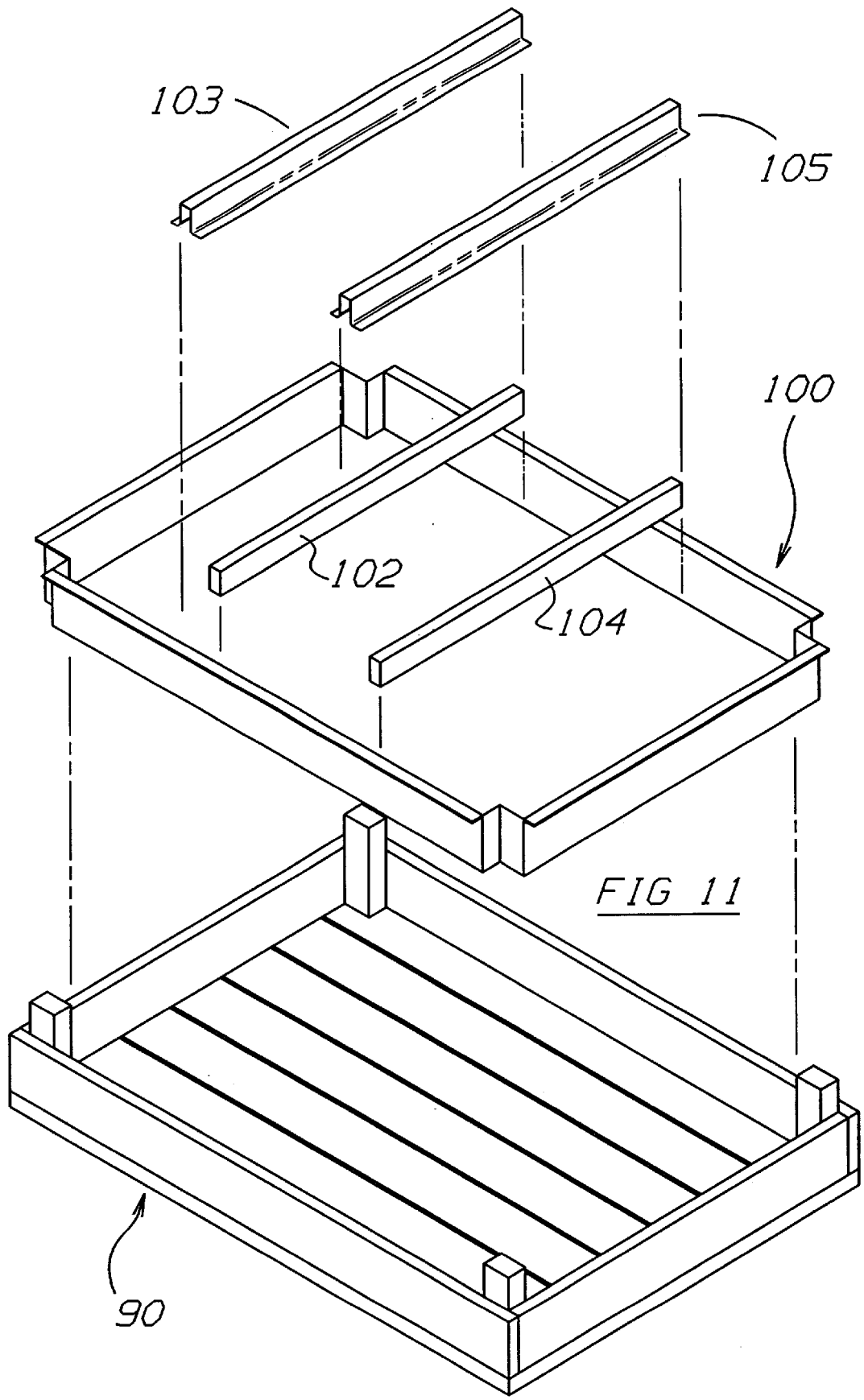
FIG. 11 is a perspective view of a plain version of the tray liner, as it would be assembled into a wooden mushroom-growing tray with additional structural supports added at assembly.

Referring to FIG. 11, an alternate embodiment is disclosed. The portions of the liner covering the wooden, structural cross-members 26, 27 (FIG. 2) of the mushroom-growing tray that are molded into the liner are one way of molding the tray liner 20 shown in FIG. 2. If a customer desires, the structural cross-member coverings could be omitted from the design of the molded tray liner. This alternate style of liner would be placed into newly constructed wood trays prior to the placement of the wooden structural cross-members, which, once set into place over the liner, would then secure the liner to the tray. In FIG. 11, there is a plain wooden mushroom-growing tray 90 shown, without structural cross members such as that described above. There is a plain tray liner 100, also shown without structural cross member coverings such as that described in reference to the bridge member coverings 26, 27. (FIG. 2). There is a pair of structural cross members 102, 104 shown in FIG. 11, which may be fabricated out of wood or other recyclable material as described above, and which may be added to the assembly of the tray liner 100 to the mushroom growing-tray 90. If desired, these structural cross members 102, 104 may be coated or covered by a variety of means including as shown in FIG. 11 with separate cover members 103, 105. The members 103, 105 may be fastened at assembly by conventional means such as stapling, screws, etc. The plain design illustrated in FIG. 11 of the fray liner 100 may be the most desirable in terms of coping with the variations of dimensional tolerances associated with construction of wood growing trays as well as being the most cost-effective design. Due to this simplistic design it could result in the lowest cost liner. Therefore, the plain wooden mushroom-growing tray 90 could be protected by inserting the tray liner 100 into a mushroom-growing tray 90 to form an assembly, securing the tray liner 100 to the mushroom growing tray 90, adding at least one structural support members 102, 104 to an inside section of the mushroom growing tray 90 and fastening the structural support member 102, 104 to the assembly.

Figure 12:
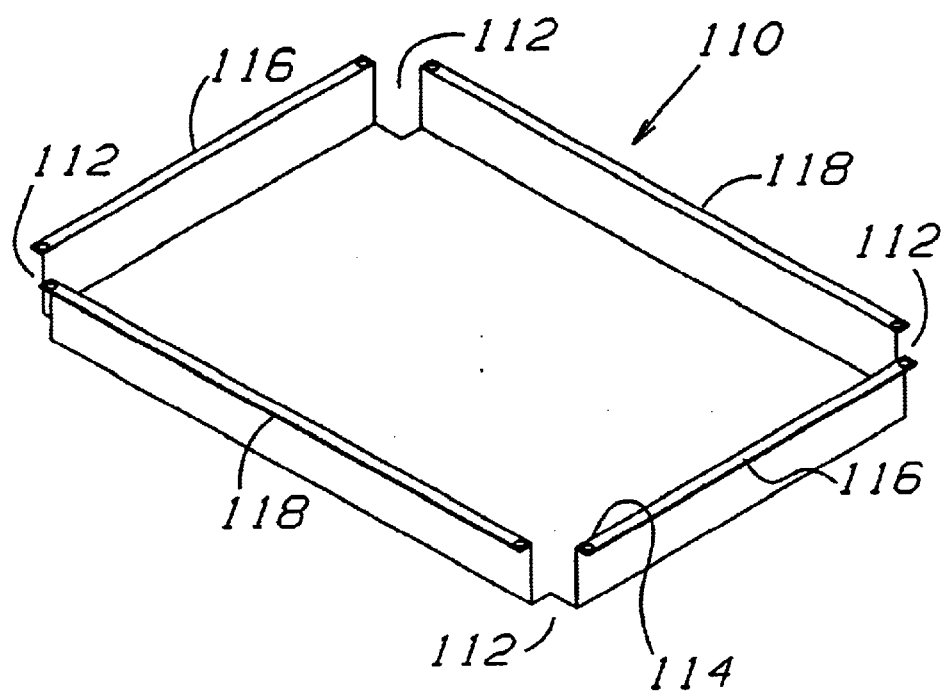
FIG. 12 is a perspective view of an alternate embodiment of a plain version of a tray liner without contiguous upstanding walls in the corners.

Referring now to FIG. 12, FIG. 13 and again FIG. 1, there is shown another alternate embodiment of a plain version of a tray liner 110 for a mushroom-growing tray 30. In FIG. 12 a tray liner 110 is shown, with a notch 112 in each corner. In this design, the tray liner 110 is formed, as described in the vacuum process described above, without the contiguous upstanding walls 28e, 28f that are designed to cover the upstanding corner frame members 31a, 31b, 31c and 31d of the mushroom growing tray 30. In the construction of the tray liner 110, there is a lip 116, and a lip 118 on the ends and the sides of the tray liner 110, that are designed to cover the exposed ends of the wooden mushroom-growing tray 30 described earlier. The lip 116, and 118 typically have an aperture, a tab, or protrusion that will match with a comer-covering member designed to be a corner covering component 120 that may be added to the formed tray liner 110. The purpose of the corner-covering component 120 is to fill the void of the notch 112.

Figure 13:
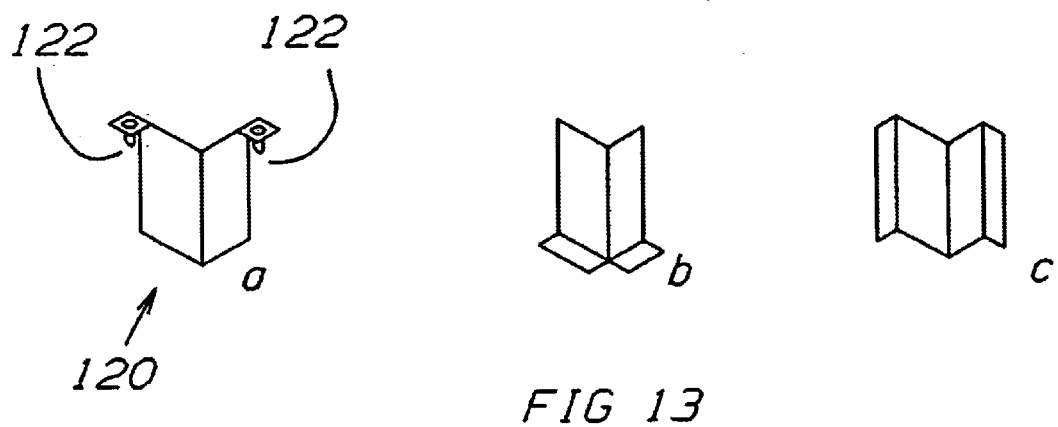
FIG. 13 is a perspective view of a corner-filling component used in combination with the tray liner of FIG. 12.

Referring to FIG. 13, a corner-covering component 120 is shown, as it would be fitted to one corner of the tray liner 110. FIG. 13 shows some possible variations a, b and c of such a component. The component 120 will fit to all four corners, and may be glued, stapled or mechanically attached by means of a protrusion 122 or equivalent method of attachment to the lip 116 and 118 as best fits the scheme of manufacturing. The material of the tray liner is the same as that described in reference to the tray liner 20 described above, and the manufacturing process for the tray liner 110, and the component 120 would be the same in a vacuum-forming operation.

Figure 20:
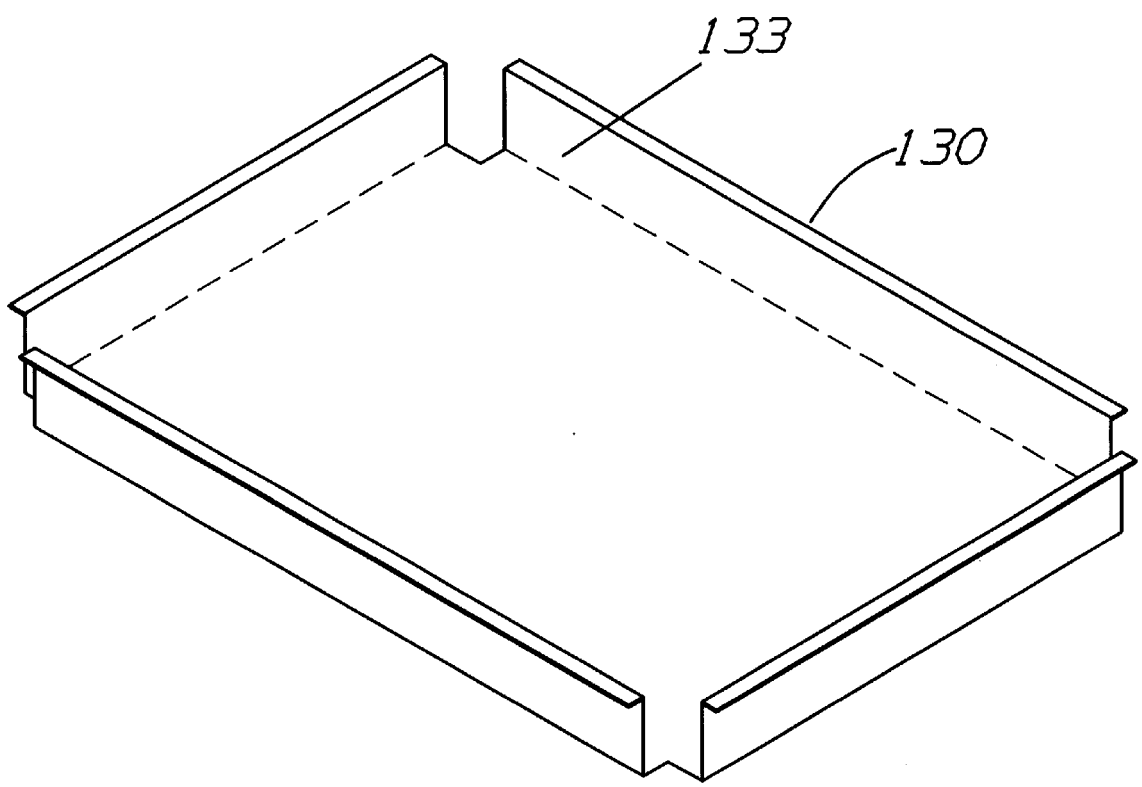
FIG. 20 is a perspective view of a tray liner, formed from a blank, and having open corners that do not cover the upstanding corner members of a mating mushroom growing tray.
Figure 21:
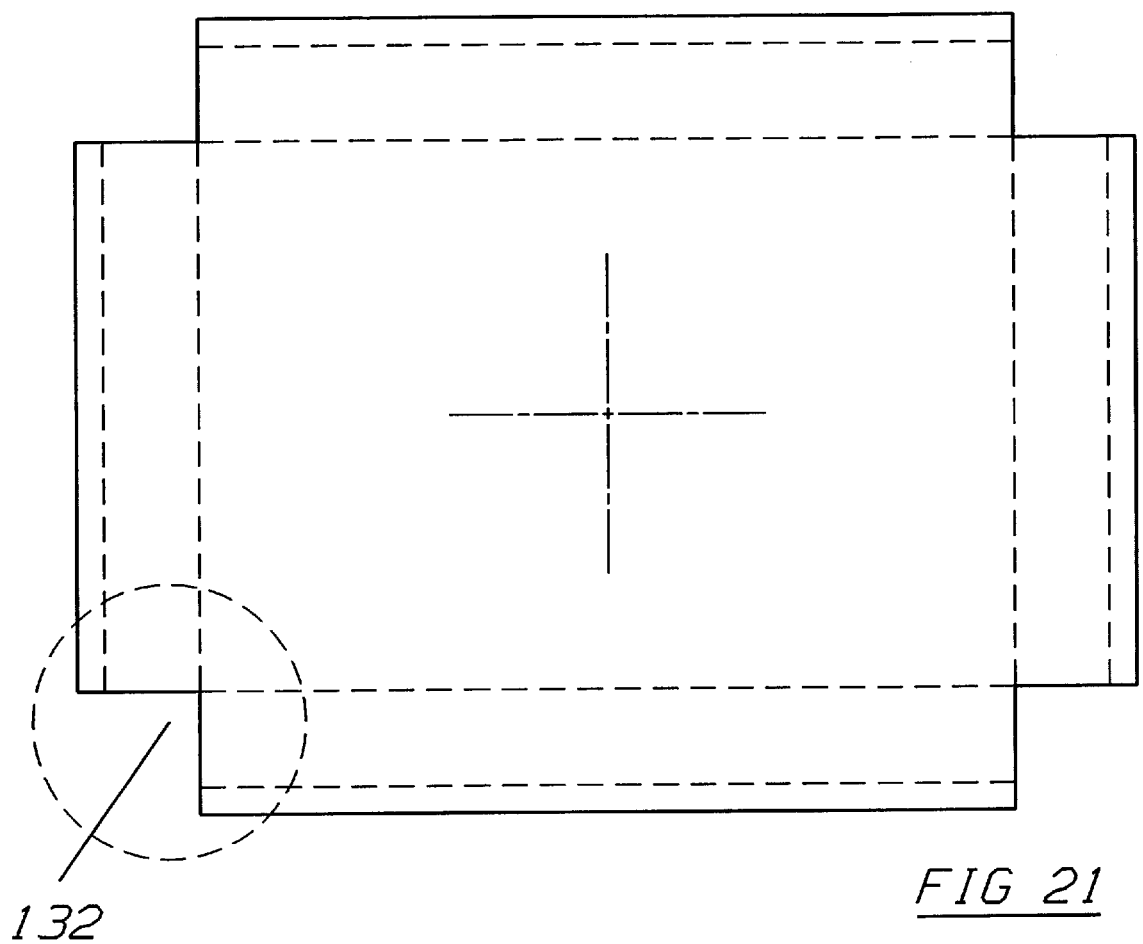
FIG. 21 is a plan view of a blank of the; tray liner of FIG. 20, showing how the blank can be manufactured with perforated areas that can be formed to meet the design of a tray liner that fits inside of a mushroom growing tray.
Figure 22:
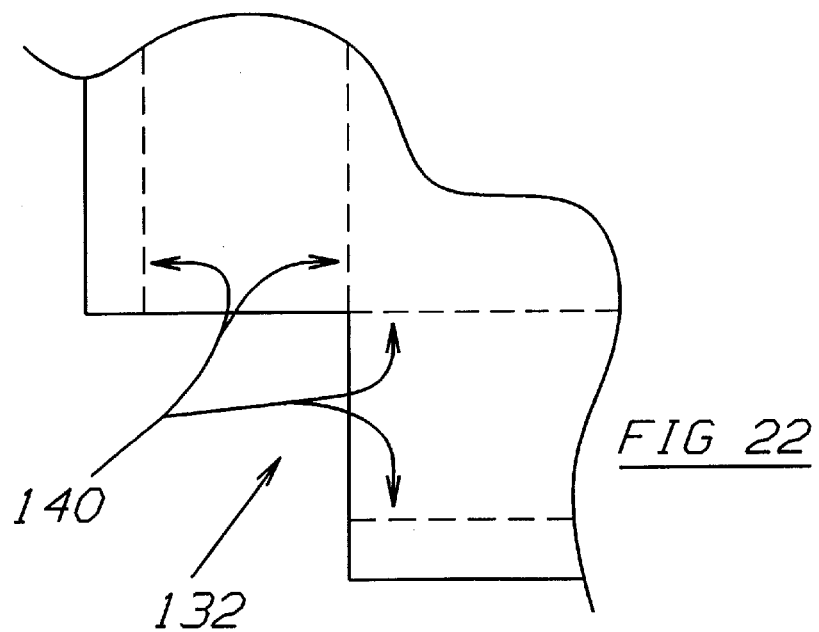
FIG. 22 is an enlarged view of a notched corner of the blank of the tray liner of FIG. 21, showing a detail of fabrication.

Referring now to FIG. 14, yet another embodiment of the present invention is illustrated, as a tray liner 30 may be manufactured using a blanking process from sheet material of the same nature as described above. The material once again would probably be of a 0.020"–0.040" thickness and resistant to moisture and deterioration from exposure to the elements or exposure to the mushroom growing medium. Again, the tray liner 130 is made of a material such as polyethylene, polypropylene or polyethylene terephthalate formable material. In this case, a tray liner 130 is shown as blanked out with a notch 132 typical in each corner. The blanking process will include a pre-weakening process such as perforation, and dimpling or compression of the material to permit bending and forming of the material to create a box-like structure thereby forming the final tray liner 130 to be inserted into a mushroom-growing tray 30. This produces a series of relief's in the material. This series of relief's extend substantially parallel to each edge of a side 131a, 131b, 131c, 131d of the substantially rectangular base member 131. The series of relief's resulting from the perforations, dimpling or compression of the material partially pierce, or semi pierces the material so as to permit the forming of a box-like structure into the tray liner 130. Additionally, the series of relief's can expand lineally to permit bending of the material so as to form the box-like structure and thereby the resulting tray liner 130. A detail of the blanking process showing a typical perforation 134 is shown in the enlarged FIG. 15 taken along the lines a—a, and it will be understood that a substitutable compression process that will aid in the forming process will also be applicable to the design of this form of tray liner. The compression process that is used may cause a dimple to form that aids in the bending process. Another direction of such a compression applied to the tray liner 130 is seen in FIG. 17 as taken from FIG. 14 along the lines of b—b. The compression is directed in a direction to permit bending in a direction 136, for example, in the case of an end 138 of the tray liner 130. The end 138 is typical of the upstanding wall section 133 of the tray liner 130 when fully formed as represented in FIG. 20. The compression process will be modified to aid in the forming of the tray liner 130 in any direction where the parts are formed. Referring to FIG. 22, the blanking process is represented as the blank of the tray liner 130 and may be manufactured using perforations throughout. It will be recognized that any combination of perforation and compression as described above will suffice. FIG. 22 illustrates a slight enlargement of the detail of the notch 132 described above, with the perforation applied as a series of perforations 140 where necessary.

Figure 18:
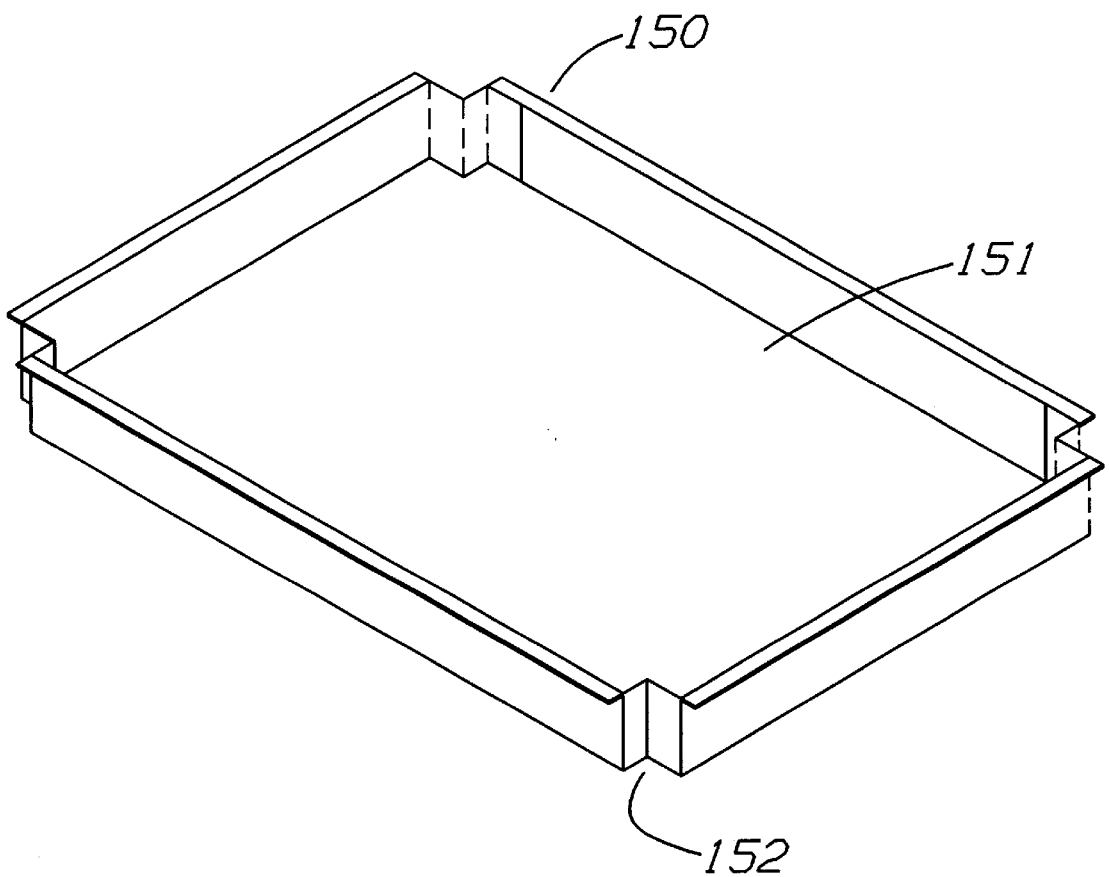
FIG. 18 is a perspective view of a formed tray liner, as folded from a manufactured blank material.
Figure 19:
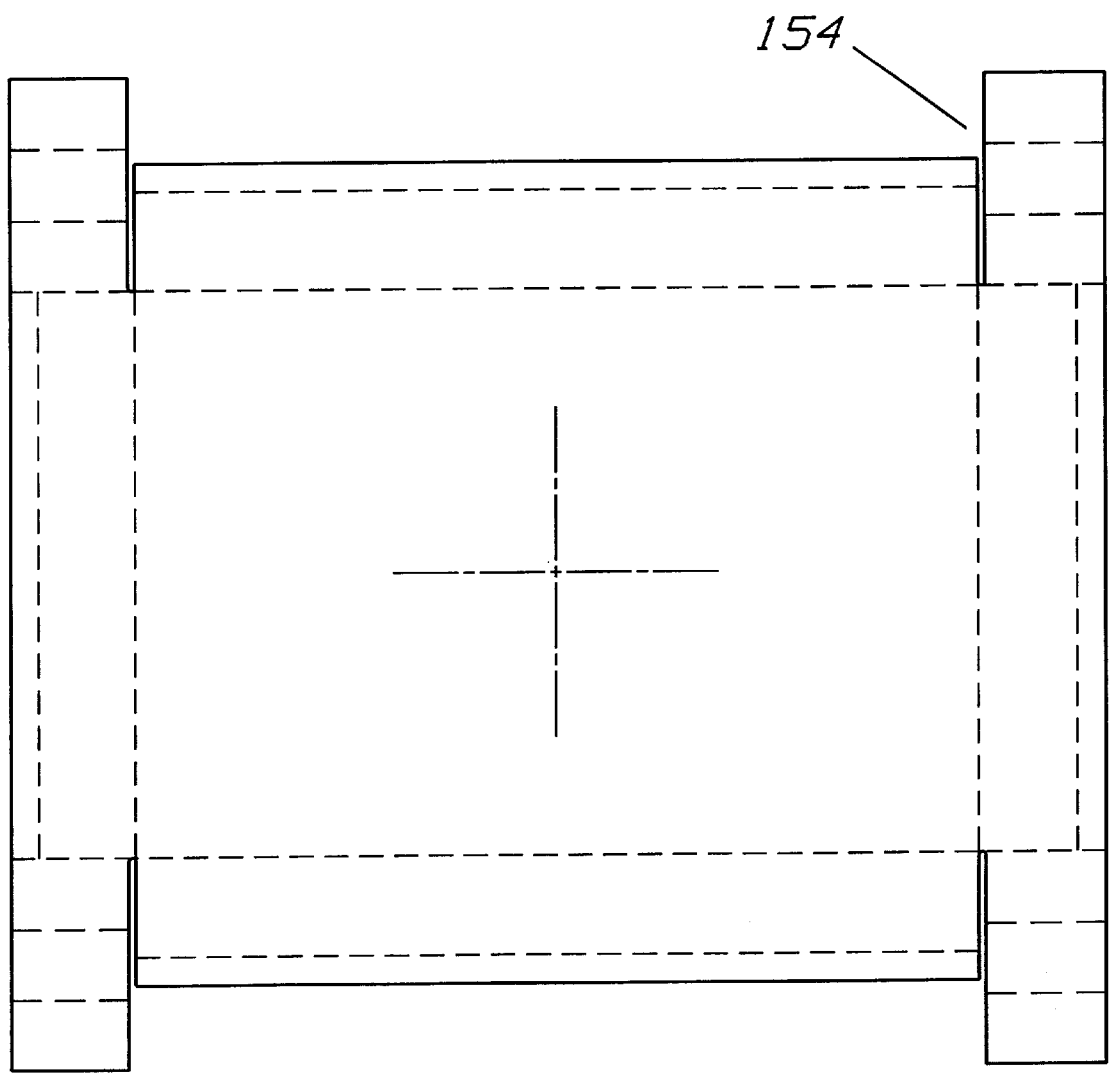
FIG. 19 is a plan view of the blank of the tray liner of FIG. 18, illustrating a method of making tabs that cover the corners of a mating mushroom-growing tray.

Yet another embodiment of a tray liner is illustrated in the perspective view of FIG. 18 wherein a tray liner 150 is shown. This is the result of yet another blanking process as illustrated in FIG. 19, manufactured from the same types of materials described above, but added details in a typical corner 152. In this design, a tab 154 is typical, as shown, blanked out in the FIG. 19, and perforated, as described above, to be folded to accommodate the upstanding corner members 31a, 31b, 31c, 31d of the mushroom growing tray 30 described earlier in this specification. The resulting tray liner 150 thereby comprises a substantially rectangular base member having a periphery of upstanding sidewalls joined at each of two sides and two ends to a base portion of the rectangular base member with a notch section located at each corner of the base member. The notch section accommodates the corner frame member located at each corner of the mushroom-growing tray. A tab 154 is formed into a corner liner component and is insertable into the rectangular base member of the formed tray liner 150 so as to cover the otherwise exposed area of each corner of the mating mushroom-growing tray. The tab 154 which is the corner liner component is generally formed into an upstanding right angle member which has two upstanding side panels with a lip projecting at right angles from each side panel that will mate with a lip on an end and side portion of the formed tray liner 150. It will be a matter of choice to manufacturer the component tray liners described herein by the various methods, and processes, as best fits cost and other considerations of the tray liner designer and manufacturer.

The assembly and use of the tray liner 20 in the wooden mushroom growing tray 30 is as follows. The tray liner 20 is inserted into the wooden tray 30 directly, with the notch sections 28a, 28b, 28c and 28d fitting between the upstanding corner frame members 31a, 31b, 31c, and 31d of the wooden tray 30 (FIG. 1). An employee of the mushroom farm, or an individual who will grow mushrooms, would depress the tray liner 20 into a co-mating position wherein the tray liner 20 is resting evenly on the generally horizontal bottom surface 30g of the wooden tray 30. When this is so, the upstanding side walls 22, 24, and upstanding end walls 21, 23 (FIG. 2) of the liner 20 are adjacently positioned to the inside walls 30h, 30k, 30l and 30m respectively of the adjoining wooden tray 30 (FIG. 1).

During the insertion process, the tray liner 20 may be stapled or otherwise fastened to the wooden tray 30 depending on the operator's preference. At this time, the mushroom growing medium may be filled into the tray liner 20, as desired.

After one or more growing breaks of mushrooms in the assembly herein described, the tray liner 20 may be emptied and the mushroom growing medium replaced to repeat the cycle. Although the intent of this invention is for the tray liner 20 to last the life of the wooden tray 30, the tray liner 20 may be replaced if necessary after a number of cycles, depending on its condition. If replaced, the tray liner 20 may be recycled, as mentioned above, to complete the process of use.

Additionally, as shown in FIG. 3, there maybe a suitable arrangement of slots (not shown) located in the bottom surface 25 of the tray liner 20. The slots may be formed manually via knife, either after liner is inserted in tray or by a machine process whereby they are punched into the bottom surface of liner 20 during manufacturing. Such slots may be desirable to achieve specific moisture levels necessary for the mushroom-growing process.

While the present invention has been disclosed and described with reference to a single embodiment thereof, it will be apparent, as noted above, that variations and modifications may be made therein. It is also noted that the present invention is representative as an example of the articles and components described and is not limited to the application to mushroom trays. It is thus, intended in the following claims to cover each variation and modification that falls within the true spirit and scope of the present invention.

What is claimed is:

1. A tray liner section that is insertable into a mushroom-growing tray, the tray liner section comprising:
   a substantially rectangular base member having a periphery of upstanding sidewalls along three sides that are joined to abase portion of the tray liner section;
   a notch section located at two corners of the substantially rectangular base member to accommodate an upstanding corner frame member located at two corners of an end of the mushroom-growing tray, the notch section having a contiguous upstanding side wall that is joined with the periphery of upstanding side walls and the base portion of the substantially rectangular base member; and,
   at least one upstanding reinforcing bridge member that matches and covers at least one upstanding bridge member attached to a base portion of the mushroom-growing tray, the upstanding reinforcing bridge member being joined to an inside portion of the upstanding side wall at an opposing side of the substantially rectangular base member.

2. A tray liner section that is insertable into a mushroom-growing tray as recited in claim 1, wherein:
   the substantially rectangular base member has a contiguous edge defining a flat end of the base member of the tray liner section, the flat end not having an upstanding side wall whereas a remainder of the substantially rectangular base member has the upstanding side walls located around a periphery formed of three sides of the substantially rectangular base member.

3. A tray liner that is insertable into a mushroom-growing tray, the tray line comprising:
   a substantially rectangular base member having a periphery of upstanding side walls;
   a notch section located at each corner of the substantially rectangular base member to accommodate an upstanding corner framer member located at each corner of the mushroom-growing tray, the notch section having a contiguous upstanding wall including a compliant corner that is joined with the periphery of upstanding side walls and a portion of the tray liner; and,
   the compliant notch section has a semi-circular form blended into the contiguous upstanding wall portion of the notch section so as to adapt to varying tolerance positions of the upstanding corner frame member of the substantially rectangular base member.

4. A tray liner that is insertable into a mushroom-growing tray as recited in claim 3, wherein:
   the upstanding sidewalls are tapered to extend in an outward direction from the base portion of the substantially rectangular base member.

5. A tray liner that is insertable into a mushroom-growing tray as recited in claim 3, wherein:
   the upstanding sidewalls are outwardly tapered vertically to form an obtuse angle between 91 and 94 degrees from the base portion of the substantially rectangular base member.

6. A tray liner that is insertable into a mushroom-growing tray as recited in claim 3, wherein:
   the upstanding sidewalls have an outward facing lip joined to each of the upstanding sidewalls along an upper sidewall edge located between the notch sections defined at each corner of the substantially rectangular base member.

7. A tray liner that is insertable into a mushroom-growing tray as recited in claim 3, wherein:
   the replaceable mushroom growing tray is formed of from the group consisting of polyethylene, polystyrene, and polypropylene or polyethylene terephthalate.

* * * * *